Jan. 3, 1933.                H. A. HADLEY                1,892,726
                            RECORDING SCALE
                         Filed May 28, 1928           3 Sheets-Sheet 2

INVENTOR
HARLAN A. HADLEY
BY
Henry Sherman
ATTORNEY

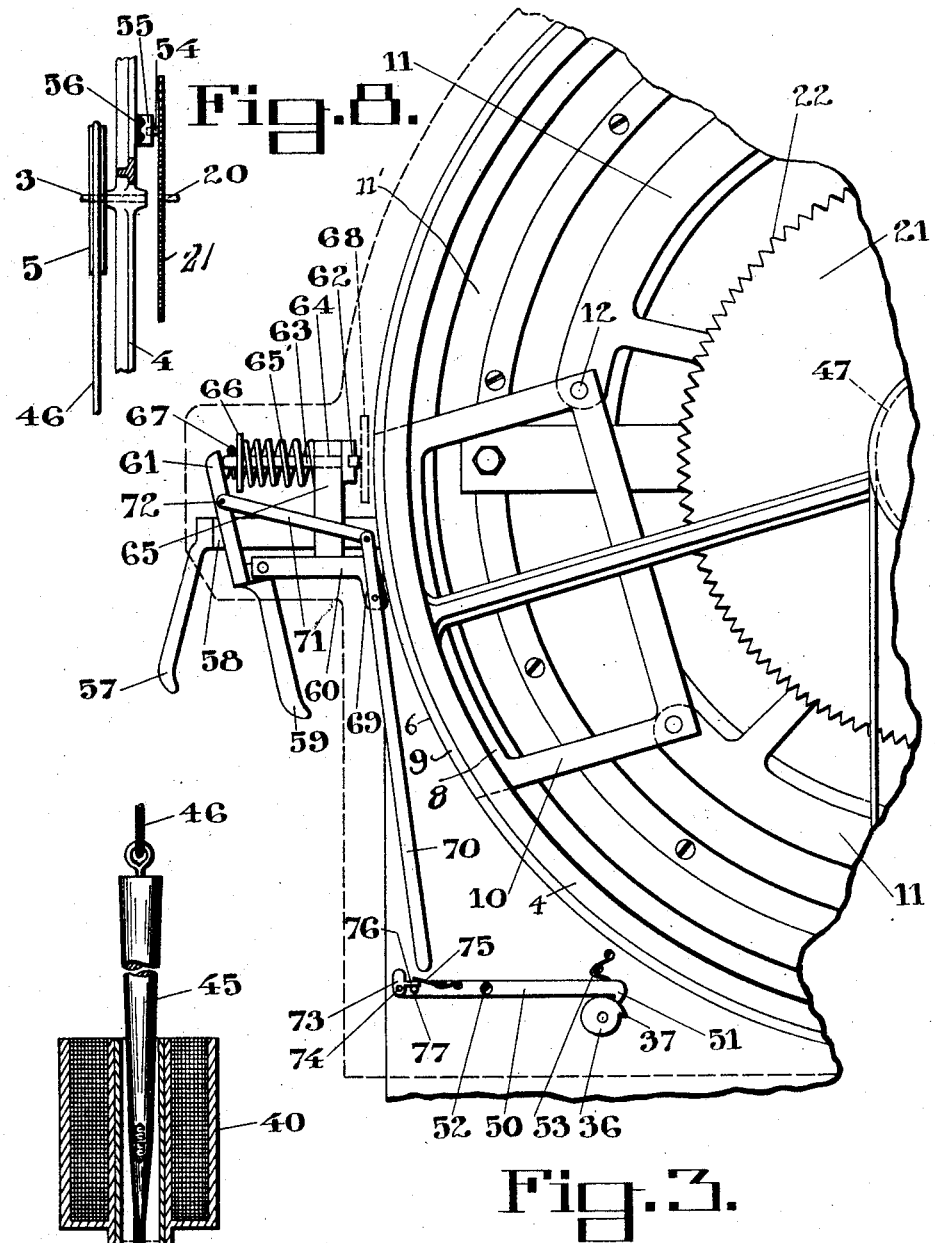

Patented Jan. 3, 1933

1,892,726

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

RECORDING SCALE

Application filed May 28, 1928. Serial No. 281,117.

This invention relates to improvements in weighing machines of that type in which an indicating member is moved over a graduated chart, the weight of the load being weighed being indicated by the extent of movement of the indicating member, but more particularly, this invention relates to weighing machines in which means are provided for recording on a paper strip, or on a ticket, the weight registered on the scale. My improved recording apparatus is designed especially for attachment to and use with a weighing apparatus of the type shown in the application for patent of Morton H. Starr, Serial No. 104,255 filed April 24, 1926, which application discloses a weighing machine provided with auxiliary counterbalances and an auxiliary movable dial by means of which the capacity of the scale is increased, the total load being determined by the reading of the main dial taken in connection with the reading of the auxiliary dial.

An important object of this invention is the provision in a weighing machine of improved means for obtaining a positive record of the weights of the load being weighed, the construction and arrangement being preferably such that the wheel bearing type on the periphery thereof is mounted independently of the indicating member in order that the free swinging of the indicating member be not affected and thus impair the accuracy of the scale.

Another important object of this invention is to provide, in a scale organization designed to utilize auxiliary counterbalances in the weighing of heavy loads a type carrying segment which is mounted for movement with the auxiliary dial and independently of the operating mechanism of the type carrying wheel, the segment of the auxiliary dial being operated through the auxiliary counterbalancing mechanism.

Still another important object of this invention is the provision of improved means for locking the indicating member in position after coming to rest during a weighing operation and simultaneously setting in motion the type carrying wheel, the construction being such that the indicating mechanism cooperates with the wheel to stop the latter element in proper operative, or registering, position.

Other objects of this invention, together with certain details of construction and combination of parts, will be more particularly described by reference to the accompanying drawings and pointed out in the appended claims.

In the drawings:

Figure 3 is an enlarged view of a section of the dial head showing the platen mechanism and the locking and unlocking arrangement;

Figure 7 is a cross-sectional view of the solenoid and its dashpot attachment; and Figure 8 is a cross-sectional view taken on line 8—8 in Figure 1 showing the stop means for positioning the type carrying wheel.

Similar characters of reference indicate corresponding parts throughout the several views.

Figure 1:
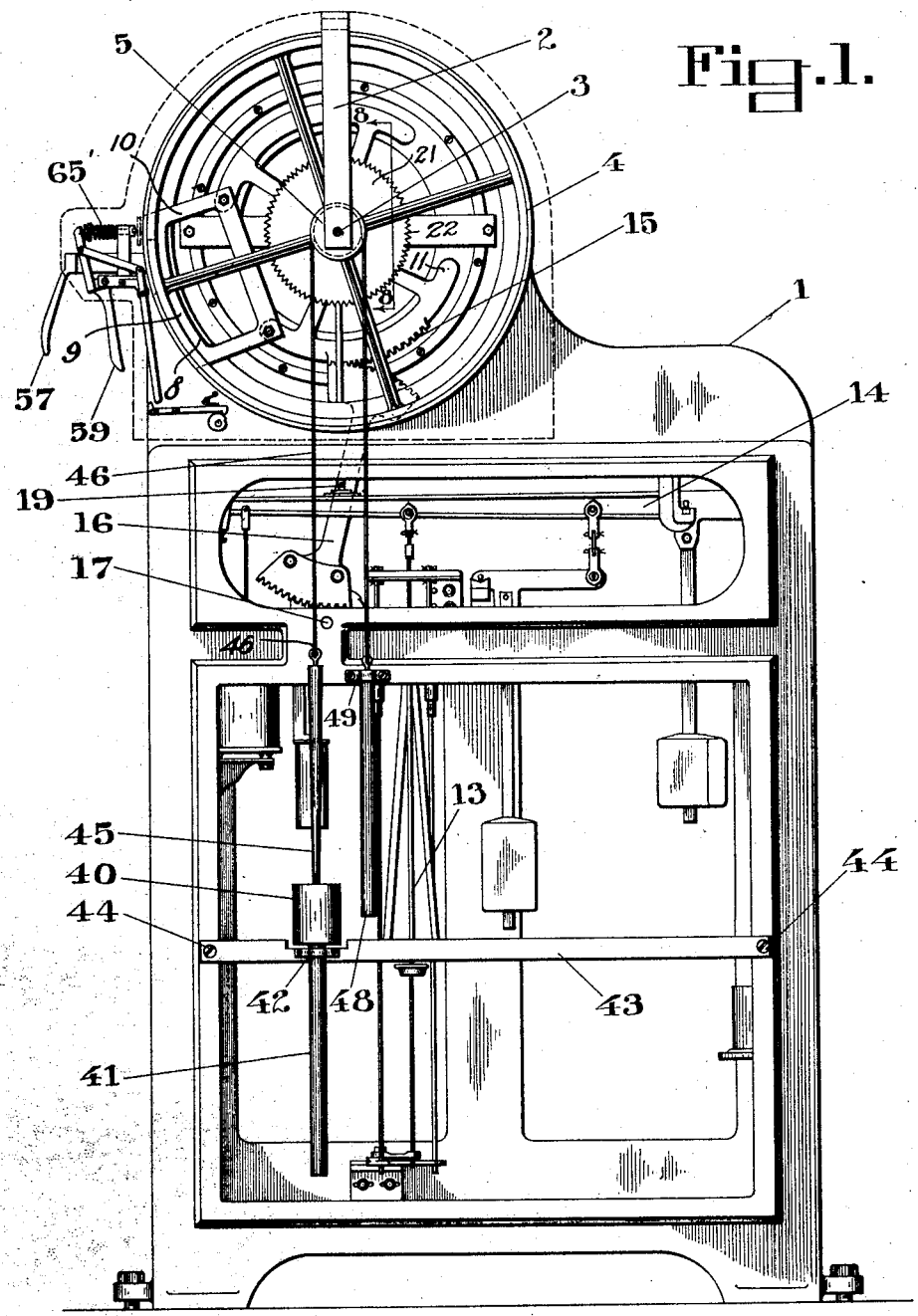
Figure 1 is a rear elevation of a dial scale embodying the invention.

Referring to the drawings wherein the preferred embodiment of my invention is shown, the reference character 1 designates the casing, or housing, of a weighing machine of the type shown and described in the co-pending application for patent of Morton H. Starr, above-identified, to the rear of which housing my improved recording means is adapted to be attached.

Figure 2:
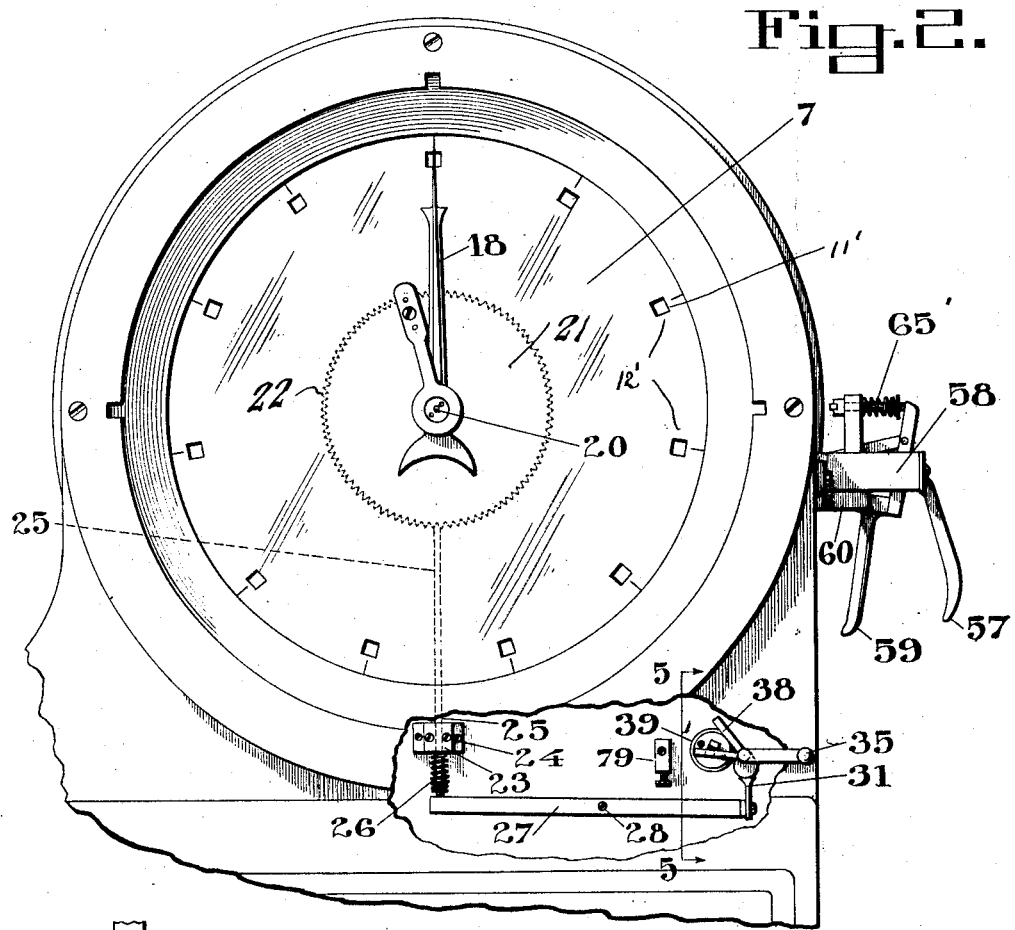
Figure 2 is a front view of the dial head with a portion thereof broken away to show the locking mechanism and the solenoid switch.
Figure 4:
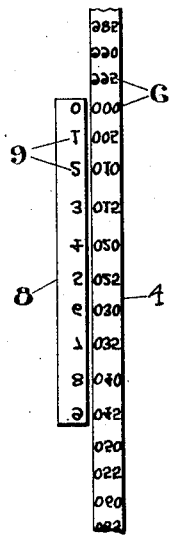
Figure 4 is a detail view of the type carrying elements.
Figures 5, 6:
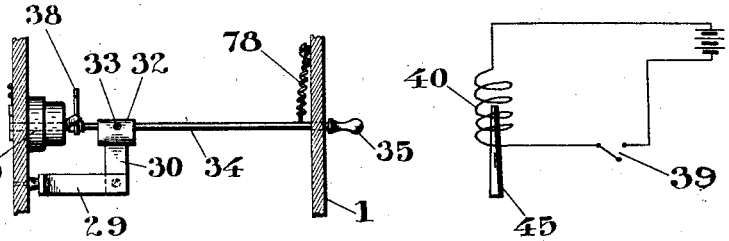
Figure 5 is a sectional view taken on line 5—5 in Figure 2.
Figure 6 is a diagrammatic view of the solenoid circuit.

Fixedly mounted upon the top and rear of the housing is a bracket 2 in the lower end of which is fixed an inwardly extending stub shaft 3, said stub shaft having revolubly mounted thereon a wheel 4. A smaller wheel 5 is fixed to the wheel 4 and is adapted to rotate it, as will be hereinafter set forth. The periphery of the wheel 4 is provided with a series of numbers 6 increasing by fives from 000 to 995, the numbers, which correspond to the numbers on the face of the dial 7, being spaced at equal intervals about the periphery of the wheel (Fig. 2). Cooperating with the type carrying wheel 4 is a segment 8 which has applied to its periphery a series of numbers 9 from zero to nine, the segment being so positioned that any one of the numbers thereon is adapted to be brought into position relative to the innermost, or hundreds, row of figures on the type wheel.

The segment 8 is formed integral with a frame 10 which is suitably attached to a spider 11 by means of screws, or rivets, 12 (Figs. 2 and 3). The spider 11 also carries behind the main dial 7 the auxiliary dial 11' which may bear on its face indicia arranged to be visible through apertures 12' formed in the main dial 7. Suitable connections are provided for moving the segment in its arc in accordance with the depositing of the auxiliary counterpoise weights (not shown) on the skeleton cone 13, suspended from beam 14, such connections being identical with those shown in Starr application, above-referred to, for moving the spider. These connections comprise a gear segment 15 on the spider, which gear segment engages an idler gear member 16 pivotally supported at its center on a shaft mounted on the housing 1, the idler gear member being in engagement also with a pinion fixed on a shaft 17. It has been deemed unnecessary to illustrate in this application a series of weights mounted on the cone 13 or the connections for raising and lowering the weights and moving the spider, only portions of which are shown, inasmuch as these matters will be fully understood from a study of the application above-referred to. It will be understood that as the weights are deposited on the cone 13, the idler gear member 16 will be turned in a counterclockwise direction thereby rotating the spider 11 in a clockwise direction thus serving to move the frame 10 and bring a higher number on the segment 8 into operative position.

As is described in the Starr application, the movement of the beam is communicated to the indicator 18, through a rod 19 suitably mounted on the beam, the rod having a rack on its upper extremity adapted to mesh with a pinion fixed to a shaft 20. The shaft 20 is in axial alinement with the stub shaft 3. The indicator, which is mounted upon the forward end of shaft 20, is adapted to be rotated by the rack and pinion arrangement to assume a position on the dial face corresponding to the relative position of the beam.

Suitably mounted on the indicator shaft 20, and adapted to rotate therewith, is a locking disk 21 in the periphery of which are cut a series of notches 22, the notches being equal in number to indications on the dial face 7 and each notch corresponding to a particular indication thereon. Slidably mounted in a bracket 23 fixed to the rear wall of the housing by any suitable means, such as screws 24, is a locking rod 25 which cooperates with the notched locking disk to lock the indicator in position after it has come to rest during a weighing operation.

The coil spring 26 normally operates to maintain the rod 25 in lowered, or inoperative, position. Referring to Figure 2, the rod is shown in elevated, or locking, position, the rod being elevated by means of a lever arm 27 pivoted at 28 to the rear wall of the housing. The end of the lever arm remote from the rod 25 is offset, as at 29, and carries at the end of the offset portion a rigidly fastened upright member 30 having an enlarged head portion 31 which cooperates with a cam 32, rigidly mounted by means of a set screw 33 on a cam shaft 34, to rock the lever arm 27 about its pivot 28 for the purpose of elevating the rod 25. The cam shaft extends through both front and rear walls of the scale housing carrying at its foreward end an operating, or starting, handle 35 and at its opposite end a locking ratchet 36 having a single tooth 37. Intermediate its ends the cam shaft has fixed thereon a forked member 38 which is adapted to operate a switch 39 attached in any suitable manner to the rear wall of the housing. The purpose of the switch will hereinafter be set forth.

A solenoid coil 40 to which is attached a cylinder 41 of a dashpot is fixed by means of bracket 42 to a cross-piece fastened to the rear side walls of the housing by means of screws 44. To the core 45 of the solenoid is attached a chain 46. The chain is trained over the wheel 5 which has a groove 47 in the periphery thereof for the purpose of facilitating the retention of the chain thereon. The other end of the chain carries a counterweight 48 of a weight sufficient to return the solenoid core to its normal position (as is shown in Figure 1) when the solenoid is de-energized. A bracket 49 suitably attached to the housing guides the counterweight in its vertical travel.

It will be understood that after the beam and indicator moved thereby have come to rest during a weighing operation, the operator turns the handle 35 thereby rotating the cam shaft and the cam 32, the cam cooperating with the head portion 31 of the upright member 30 to depress the same thus causing the lever arm 27 to rock about its pivot 28, which elevates the locking rod 25 into operative, or locking, position against the action of coil spring 26. The rod 25 is retained in elevated position by means of a locking lever 50 having a tooth 51 which engages the tooth 37 on the locking ratchet 36.

The lever 50 is pivoted at 52 and is maintained in contact with the ratchet by means of a leaf spring 53 suitably fixed to the rear face of the scale housing. The same movement of the handle 35 which causes the locking of the indicator and beam in position also serves to throw the switch 39 thus closing the solenoid circuit which energizes the solenoid coil.

The energized solenoid coil attracts the solenoid core 45 and causes it to move downwardly carrying with it the chain 46 which rotates the wheels 4 and 5 in a counterclockwise direction (see Figure 1) bringing the type-carrying wheel 4 to a position determined by the indicator, the indicia in operative position on the type wheel corresponding to the number on the dial face to which the indicator points. When it is found necessary to increase the capacity of the scale, an auxiliary counterpoise weight is deposited on the skeleton cone, as is disclosed in the Starr application, above-referred to. The mechanism employed in depositing the weight on the cone receiver also causes the spider and segment 8 to rotate in a clockwise direction to bring a new digit on the segment into operative relation to the operative line of type on the wheel 4. Each weight added to the cone receiver increases the capacity of the scale one thousand pounds and it will be readily understood that, as an additional weight is deposited on the cone, the segment is rotated to bring a higher digit into operative position. As the weights are removed from the cone the segment is rotated in a counterclockwise direction and when all the weights are removed from the cone, the segment will register zero in operative position.

The extent of rotation of the type wheel 4 is determined by the position of a stop pin 54 mounted on the face of the notched disk 21, which stop pin is rotated with the disk and cooperates with a stop bracket 55 suitably attached to the type wheel 4, as by means of screws 56, to arrest the rotation of the wheel 4 in proper position. To prevent a too rapid discent of the core 45 and consequently a too rapid rotation of the wheel 4, the core has attached to its lower extremity a plunger 57 which cooperates with the cylinder 41, containing a suitable fluid, to dampen the action of the solenoid coil on the core. The plunger carries an adjustable valve 58, the function of which is to regulate the dampening effect of the dashpot, as is well understood in the art.

The means for recording the weight in connection with the apparatus so far described comprises a stationary grip 57 fixed to the free end of a bracket 58 suitably mounted on the scale housing, the stationary grip cooperating with a movable grip 59, pivotally mounted on a bracket 60 also mounted on the scale housing, to form a pistol grip, the movable grip having preferably an offset member 61 integral therewith adapted to force a platen member 62 against the type-carrying members 4 and 8. The platen member is mounted on a rod 63 slidably mounted in an opening 64 formed in the free end of a post 65 mounted on the bracket 60. A coil spring 65' mounted on rod 63 is adapted to return the platen to inoperative position after an impression is taken, the spring being held on the rod by means of a washer 66 and a cotter pin 67, as is well understood in the art. To record the weight of the load on the scale platform a ticket, or strip of paper, is inserted in a slot 68 and the grips 57 and 59 brought together which causes an impression to be made on the ticket, as will be readily understood.

Pivotally mounted on an offset portion 69 of the bracket 60 is a releasing rod 70 which at its upper extremity is pivoted to another rod 71 pivotally attached at 72 to the offset portion 61 of the grip 59. It will be understood, that, as the grips 57 and 59 are brought together to make an impression on a ticket, the lower extremity of the releasing rod 70 will move toward the left as viewed in Figure 3, thus rocking a dog 73 about a pivot 74 as it passes beyond said dog. The dog will return to its normal position under the influence of a leaf spring 75 suitably attached to the lever 50, the normal position of said dog being determined by a projection 76 integral with said dog cooperating with a stop pin 77 on lever 50 to limit the movement of said dog. As the grips 57 and 59 are released, after an impression had been made, the spring 65 will force the grips apart causing the rod 70 to be moved to the right which depresses the dog 73 and with it the left end of ratchet lever 50. Thus, the ratchet will be released and the cam shaft will be rotated back to its normal position under the influence of a spring 78 suitably attached to the front wall of the scale housing and the cam shaft. The rotation of cam shaft will throw open the switch causing the de-energization of the solenoid coil which allows the type wheel 4 to return to normal position under the action of counterweight 48 and will unlock the indicator as the cam surface is rotated out of contact with the enlarged portion 31 mounted on the lever arm 27, the lever arm being rocked on its pivot when the locking rod 25 is forced downwardly out of contact with the notched disk 21 by the spring 26. An adjustable stop 79 limits the movement of the lever arm.

Having thus described my invention what I claim as new and desire to secure by Letters Patent of the United States, is:

1. In a device of the character described, the combination with a weighing mechanism including a shaft having an indicator thereon adapted to cooperate with a chart, of a recording means comprising a rotatably mounted type wheel, said shaft having means co-axially disposed thereon for determining the position of said type wheel for a recording operation.

2. In a device of the character described, the combination with a weighing mechanism including a shaft having an indicator thereon adapted to cooperate with a chart, of a recording means comprising a type wheel rotatably mounted independently of said indicator, said shaft having means co-axially mounted thereon for determining the position of said type wheel for a recording operation.

3. In a device of the character described, the combination with a weighing mechanism including a shaft having an indicator thereon, of a recording means comprising a rotatably mounted type wheel, said shaft having a disk fixed thereon, and means on said disk for determining the position of said type wheel for a recording operation.

4. In a device of the character described, the combination with a weighing mechanism including a shaft having an indicator thereon, of a recording means comprising a type wheel rotatably mounted independently of said indicator, said shaft having a disk fixed thereon, and means on said disk for determining the position of said type wheel for a recording operation.

5. In a device of the character described, the combination with a weighing mechanism including a shaft having an indicator thereon, of a recording means comprising a type wheel rotatably mounted independently of said indicator, a disk fixed on said shaft, means cooperating with said disk to lock said indicator in position and means on said disk for determining the position of the type wheel for a recording operation.

6. In a device of the character described, the combination with a weighing mechanism including a shaft having an indicator thereon, of recording means comprising a type wheel rotatably mounted independently of said indicator, a disk fixed to said shaft, manually controlled means for locking said indicator and disk in position and means on said disk for determining the position of said type wheel for a recording operation.

7. In a device of the character described, the combination with a weighing mechanism including a shaft having an indicator thereon, of recording means comprising a type wheel rotatably mounted independently of said indicator, a disk having notches in the periphery thereof fixed to said shaft, a rod cooperating with said notches to lock said disk in position, cam means for operating said rod and means on said disk for determining the position of said type wheel for a recording operation.

8. In a device of the character described, the combination with a weighing mechanism including a shaft having an indicator thereon, of recording means comprising a type wheel rotatably mounted independently of said indicator, a disk having notches in the periphery thereof fixed to said shaft, a rod cooperating with said notches to lock said disk in position, manually controlled cam means for operating said rod and means on said disk for determining the position of said type wheel for a recording operation.

9. In a device of the character described, the combination with a weighing mechanism including a shaft having an indicator thereon adapted to cooperate with a chart and recording means comprising a rotatably mounted type wheel, of coacting mechanical and electrical means for simultaneously locking said indicator and causing the rotation of said type wheel, and means controlled by the weighing mechanism for determining the position of the type carrying elements.

10. In a device of the character described, the combination with a weighing mechanism including a shaft having an indicator thereon adapted to cooperate with a chart and a recording means comprising a rotatably mounted type wheel, of manually controlled means for simultaneously locking said indicator and coacting electrical means for causing the rotation of said type wheel, and means controlled by the weighing mechanism for determining the position of the type carrying elements.

11. In a device of the character described, the combination with a weighing mechanism and a recording means including a type carrying wheel mounted independently of said weighing mechanism, of means co-axially mounted with the said type carrying wheel for causing the rotation of said type carrying wheel under control of a solenoid and means controlled by the weighing mechanism for determining the position of the type wheel.

12. In a device of the character described, the combination with a weighing mechanism including a shaft having an indicator thereon and a recording means comprising a type carrying wheel and a solenoid for causing the rotation thereof, of means for simultaneously locking said indicator and causing the energization of said solenoid and means controlled by the weighing mechanism for determining the position of the type wheel.

13. In a device of the character described, the combination with a weighing mechanism including a shaft having an indicator thereon, a recording means comprising a type wheel and a solenoid for causing the rotation thereof and means controlled by the weighing mechanism for determining the position of the type wheel, of manually operated means for simultaneously locking said indicator and causing the energization of said solenoid and means for taking an impression off said type wheel.

14. In a device of the character described the combination with a weighing mechanism having means for increasing the capacity thereof including a movable chart, of recording means comprising a type carrying segment, said segment being movable with said chart.

15. In a device of the character described, the combination with a weighing mechanism including means for increasing the capacity thereof, of recording means comprising a plurality of type carrying elements, one of said elements being movable by said capacity increasing means and the other element being mounted for movement independently of said weighing mechanism, and means controlled by the weighing mechanism for determining the position of the type carrying elements.

16. In a device of the character described, the combination with a weighing mechanism, of recording means comprising a plurality of type carrying elements, one of said elements being independent of said weighing mechanism and means controlled by the weighing mechanism for determining the position of the type carrying elements.

In testimony whereof I hereunto affix my signature.

HARLAN A. HADLEY.